PLURAL TRACK MAGNETIC REPRODUCING APPARATUS

Filed Jan. 18, 1954 2 Sheets-Sheet 1

INVENTOR.
WAYNE R. JOHNSON
BY
Lippincott & Smith
ATTORNEYS

PLURAL TRACK MAGNETIC REPRODUCING APPARATUS

Filed Jan. 18, 1954 2 Sheets-Sheet 2

INVENTOR.
WAYNE R. JOHNSON
BY Lippincott & Smith
ATTORNEYS

United States Patent Office 2,813,927

Patented Nov. 19, 1957

2,813,927

PLURAL TRACK MAGNETIC REPRODUCING APPARATUS

Wayne R. Johnson, Los Angeles, Calif., assignor, by mesne assignments, to Minnesota Mining & Manufacturing Co., St. Paul, Minn., a corporation of Delaware

Application January 18, 1954, Serial No. 404,587

4 Claims. (Cl. 178—6.6)

Figure 1:
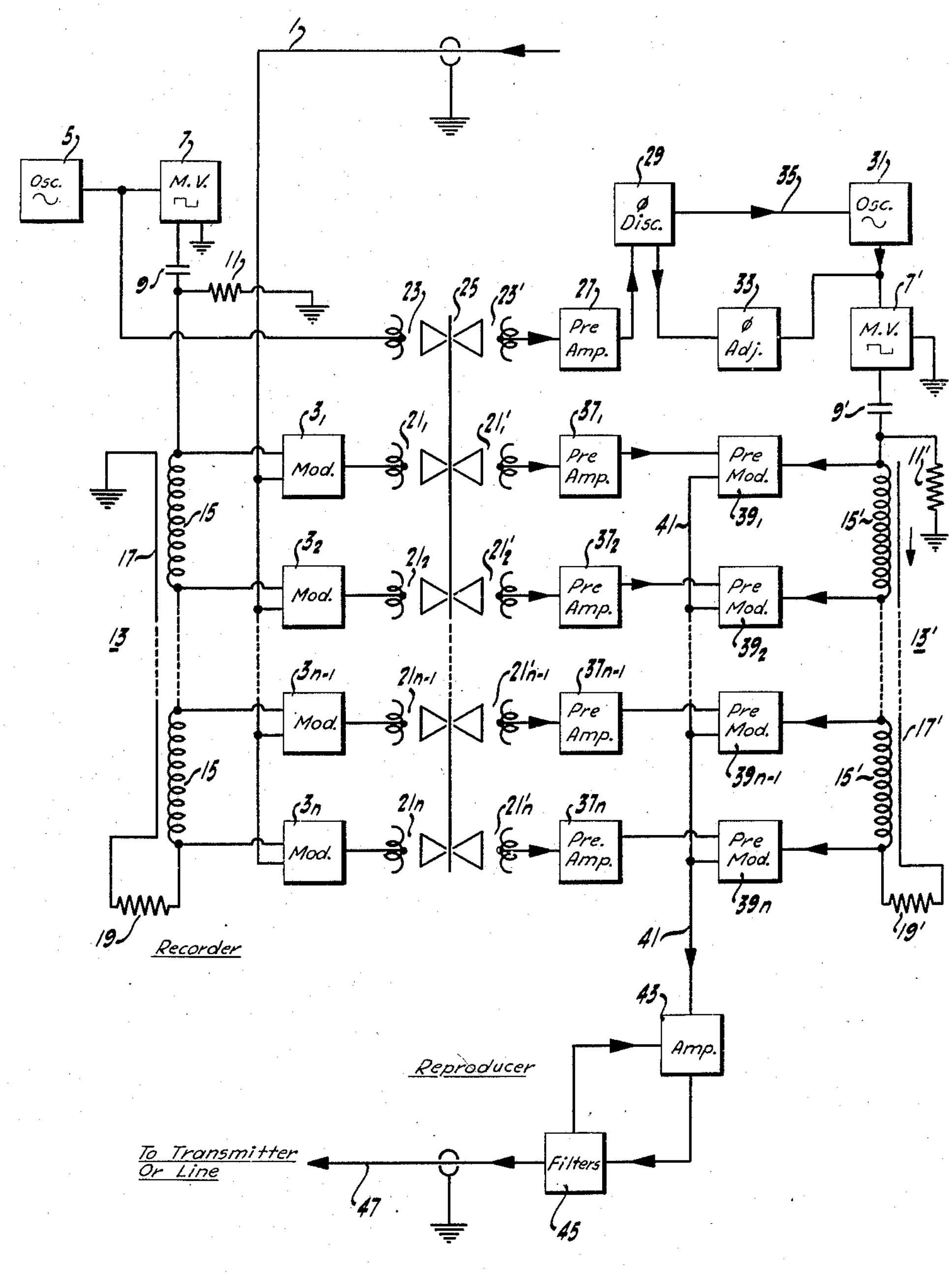

This application relates to apparatus for reproducing broad-band electrical signals, magnetically recorded as parallel tracks on a common reproducing medium. In a system of recording television and other signals having similar frequency distribution to which the present invention applies, successive instantaneous values of the signal to be recorded are modulated on different, phase-displaced carrier waves of a common frequency, the successive carrier waves upon which successive instantaneous values are recorded being retarded in phase by like increments so that, considered collectively, the various carriers provide a succession of wave crests (positive or negative) substantially uniformly spaced in time, with the crests which occur in succession representing in amplitude the amplitude of successive samples of the wave recorded. While the waves thus recorded and reproduced in accordance with the invention herein to be described will, for convenience, be referred to as television signals, it is to be understood that the invention is applicable to other signals possessing the same general characteristics, such as radar signals, and signals to be displayed in like manner by the modulation in visual intensity of a raster traced by repeated scannings of the display surface of a cathode-ray tube, or other apparatus presenting like visual characteristics.

The particular characteristic upon which operation of the present invention depends is the distribution of frequencies in the band represented by the signals to be recorded and reproduced or reconstituted.

Since the facts concerning this frequency distribution are best known in connection with television signals it will be discussed herein in that connection. In the generation and reproduction of such signals a field of view is scanned at a relatively high rate in one direction and at a relatively low rate in the other, to produce a raster consisting of parallel lines. In a normal television field a large proportion of the area scanned is stationary and therefore, in general, each time the scanning element traverses a specific portion of the field a signal of like phase and amplitude will be produced. When there is motion in the field of view the phases will usually be displaced somewhat, but in comparison with the higher frequency components the changes in both phase and amplitude are usually relatively slow. It follows from this that the frequencies developed in the resulting signals are very largely harmonics of the two scanning frequencies, i. e., the lower or field frequency and the higher or line frequency of the scanning operation. Where there is motion in the field of view this is not strictly the case, but the frequencies which are produced are still grouped very closely about these harmonic frequencies. This leaves gaps in the frequency spectrum and these gaps occur at frequencies which are the odd harmonics of one-half of the line frequency, the field frequency, or both.

In addition to the well known facts above stated it is equally well known that the frequencies which have been mentioned as not present in the normal television signal if they do not exceed in amplitude the D. C. or background level, are invisible if mixed with such signals and displayed on a television screen at a repetition rate which is within the period of the persistence of vision. The proviso as to the D. C. level is necessary because the invisibility of such signals depends upon the fact that in scanning the same spot successive values of illumination are integrated by the eye of the viewer. If the area being scanned has a finite value of illumination the "invisible" frequency will show an increased value on one scanning and a decreased value on the next, so that what the eye sees is substantially the average value of illumination. "Negative illumination" however, has no physical existence and if the average value of illumination of the particular spot in question approaches zero the eye will see the positive half but there will be no corresponding negative illumination to average with it. It is therefore only if the average value of illumination is at least equal to the amplitude of the "invisible" harmonic that the effect occurs. This condition is met if the harmonic is modulated by the picture signal. The phenomenon is taken advantage of in producing "line interlace" in conventional television transmission; the line frequency of 15,750 cycles is an odd harmonic (the 525th) of one half the field frequency of 60 cycles per second. As a result the even scanning lines fill in the gaps between the odd lines and the line structure largely disappears if the lines are of sufficient width to fill the gaps between lines.

In reproducing or "decoding" signals which have been recorded in the manner above described a separate pickup or transducer head is used to engage each track on the recording medium, and separate trains of modulated signals are produced, phase-displaced as in the recording. The separate trains are decoded and combined by generating trains of pulses coinciding in frequency and phase with the crests of the various carriers. Each train of pulses is intermodulated with the corresponding carrier to produce trains of pulses which, considered from train to train, represent the instantaneous amplitudes of the original signal. These pulses are fed into a common circuit, thus reconstituting a signal which is essentially that originally recorded.

The common carrier frequency upon which the recorded signals are modulated may be one of the "invisible" frequencies; i. e., an odd harmonic of either one-half or one-quarter of the line frequency. If so it is invisible per se since it conforms to the condition that it be modulated with the picture frequencies. The sum and difference frequencies of the carrier and the frequencies modulated upon it are then necessarily odd harmonics of one-quarter or one-half the line frequency, being the sum or difference of an even harmonic and an odd harmonic. Nevertheless, the system of recording and reproduction herein considered may result in a visible pattern on the display screen. In both recording and reproduction separate instrumentalities are utilized for amplifying, modulating and demodulating each of the phase-displaced carriers. If the frequency employed for the carrier is an odd harmonic of one-quarter the line frequency, when it is intermodulated with a pulse train of the same frequency the result is both sum and difference frequencies; i. e., the D. C. component and a double frequency component. Where the frequency chosen is such that the double frequency component is an odd harmonic of one-half of either the line or the field frequency, of itself it is still invisible. If more than one such harmonic of the common carrier frequency is present, however, a visible pattern may result upon the screen owing to beat frequencies between the harmonics produced. More than one such harmonic will be produced unless all of the circuits are identical and are timed with great exactitude. Owing to the low level at which signals are picked up from the magnetic recording medium, preamplifiers are necessary. Separate amplifiers may also be used in the different channels in recording. If there is a difference in over-all gain in any one channel as compared with the other channels, even harmonics of the common carrier frequency will be present in the resultant signal from the combined channels. Most of the even harmonics of the quarter-line frequency will, however, be odd harmonics of the half-line frequency and therefore not of themselves visible although every fourth one will be. If a modulator, in either the coding or decoding apparatus, is not perfectly balanced there will be present in the combined signal odd harmonics of the common carrier frequency. These, of themselves, will also be invisible in the display. But the pulses used in both modulation and demodulation of the signal are themselves rich in harmonics, which appear in the final signal. Beat frequencies between any two odd harmonics will be even harmonics, and therefore will be visible on the display screen, even though the frequencies causing the beats are not. If the carrier frequency be so chosen that it and its harmonics are not theoretically invisible any unbalance in the various channels will form a visible pattern, irrespective of the presence of beats.

In one form of equipment utilizing the general system of recording and reproduction here described, ten channels are used, recording the signals on ten tracks wherein the phase displacement of successive carriers is 18°. Therefore, in this equipment there are ten reproducing amplifiers, ten recording heads and ten reproducing heads, and ten sampling modulators and ten decoding modulators or demodulators which must be accurately balanced if visible beat frequencies are not to be produced upon the viewing screen. This presents a problem of adjustment which is possible of solution but in practice is very difficult and time consuming. The frequencies produced upon the screen are similar to those caused by an interfering frequency fairly close to the frequency of a transmitter; the effects appear as parallel lines of light and dark, crossing the screen in one or two directions to cause either a stripe or a checkerboard pattern overlying the reproduced image.

The broad object of the present invention is to provide means to prevent the appearance of patterns of the character described upon the ultimate display screen. More specifically, among the objects of the invention are to provide decoding equipment for signals recorded in the manner above set forth which does not require exact balance of all of the elements in each channel; to provide means for eliminating from the reproduced signal those frequencies which are not visibly displayed upon the screen and thereby also eliminate visible beats between such frequencies; to provide means for removing the frequencies not visibly reproduced which leaves the desired frequencies unaffected, permitting their reproduction at full amplitude and in proper phase; to provide a type of filter for removing such frequencies which gives high attenuation of the undesired signals without introducing undesirable phase-delay in the pass bands; to provide a filtering means in which the filtering elements employed are piezo-electric crystals and to provide a means for utilizing such crystals which is as effective as and gives as sharp a response on the lower frequencies, where the Q of the crystals is relatively low, as upon the higher frequencies where crystals having a Q of 100,000 or better are readily obtainable.

As indicated at the outset of the present specification the apparatus of the present invention is embodied in the reproducing or decoding portion of the equipment. When so employed it operates to correct or eliminate the bad effects of maladjustments in both recording and reproducing equipment. Broadly, it comprises the addition of filtering means to the decoding equipment already described. Such equipment includes pickup transducer heads adapted to engage the parallel tracks upon the recording medium, each transducer head supplying a separate channel, means for developing phase-displaced pulse trains having a repetition frequency substantially identical with the carrier waves and timed so that the pulses coincide substantially with the crests of the respective carriers, means for intermodulating the pulses with respective carrier waves, and a common circuit wherein the modulated pulses resulting from such intermodulation are combined. In addition to this equipment, however, there is provided a plurality of extremely narrow band-eliminating filter means, the center of each elimination band being an integral multiple of the common carrier frequency. Where the frequencies to be eliminated are sufficiently high (in present practice above about 800 kc.) such filtering means may comprise a series resistor in the common output circuit followed by a plurality of piezo-electric crystals whose series resonant modes correspond with the harmonics of the common carrier frequency. At lower frequencies, however, where this simple arrangement does not give sufficiently sharp attenuation bands using crystal cuts which are readily obtainable, a preferred form of filter means comprises an amplifier, which may be the amplifier that would normally be used to build the signals up to the required level for modulation upon (for example) a radio transmitter. The amplifier is provided with a negative feedback loop which includes, in parallel, a desired plurality of piezo-electric crystals which are responsive, in their series-resonant mode, to the various frequencies to be eliminated. Each of the parallel branches included in the circuit may also comprise an additional series arm including an inductance and a capacitance tuned to the same frequency of response as the crystal, and a shunt arm connecting the junction of the series arm and crystal comprising a parallel-resonant circuit, also responsive to the resonant frequency of the crystal. Preferably there is also included a positive feedback loop including a small capacity which provides a feedback signal equal in amplitude and opposite in phase to that passed by the stray capacities in the negative feedback loop; this prevents the attenuation of any of the desired signals.

Figure 2:
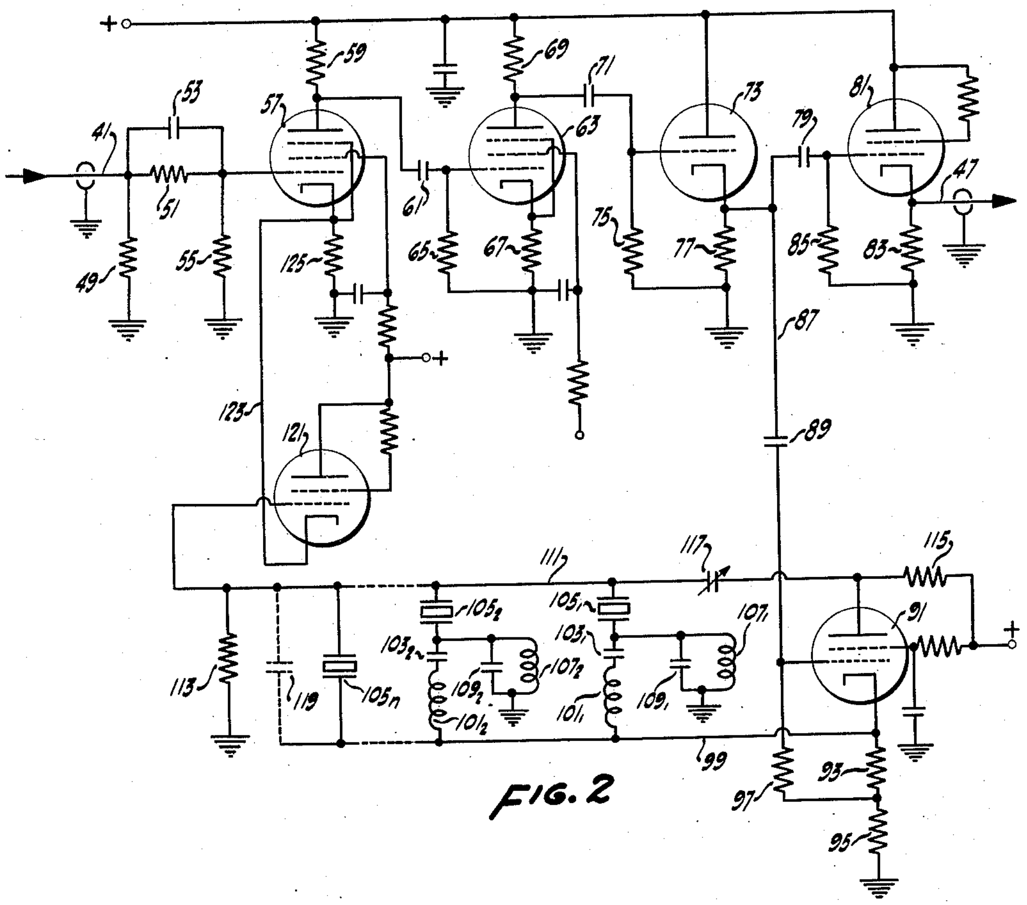
Figure 3:
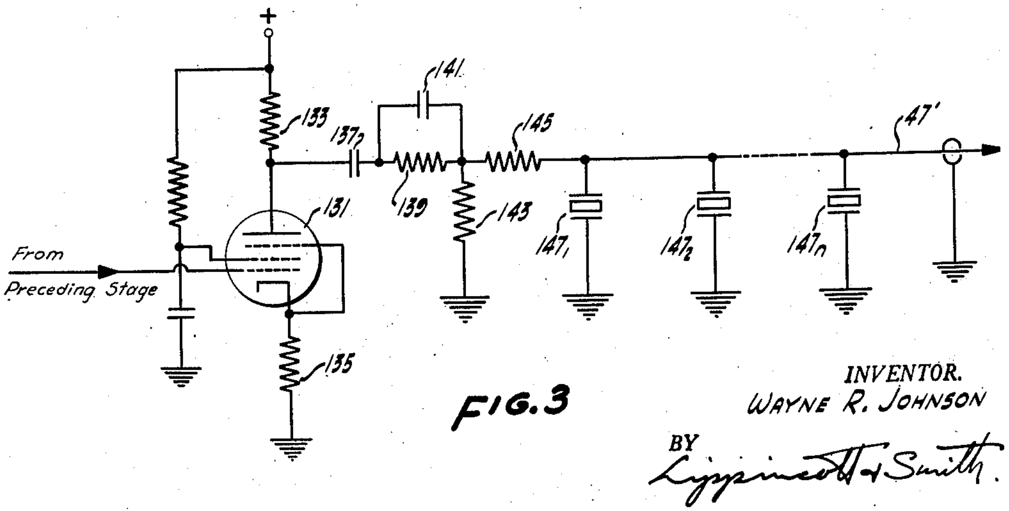

All of the above will be more readily understood from the ensuing description of a particular embodiment of the invention, taken in connection with the accompanying drawings wherein:

Fig. 1 is a block diagram of both recording and reproducing apparatus, showing the position in the over-all circuit of the filtering means with which the present application is particularly concerned;

Fig. 2 is a schematic diagram illustrating one form of band elimination filtering means, suitable for the entire band of frequencies under consideration; and Fig. 3 is a schematic diagram showing a simplified form of filter which operates satisfactorily on the higher frequencies in substantially all cases and which may be satisfactory with all of the critical frequencies under certain circumstances.

Fig. 1 of the drawings represents, in block form, the equipment utilized in recording and reproducing television signals in accordance with the method here under consideration, reduced to its simplest terms. Various modifications of such equipment are shown in the copending applications of John T. Mullin, Serial No. 195,612, filed November 14, 1950, and in copending applications of the present inventor, Serial Nos. 272,083, 272,084, and 272,085, filed February 18, 1952, the latter two applications now issued as Patents 2,694,748 and 2,695,331 respectively, and Serial No. 393,844, filed November 23, 1953. These various applications show certain modifications and refinements of the apparatus shown in the figure, and it is to be understood that the present invention may be employed in combination with the various forms of apparatus disclosed in any of the copending applications. Since, however, the complexities introduced by these refinements are not necessary to an understanding of the present invention, the simplified form has been chosen for illustration in order to avoid unnecessary explanations and to focus attention on the features directly concerned with the invention at hand.

In Fig. 1 the recording equipment is illustrated at the left of the figure and the reproducing equipment at the right. The television signal to be recorded may be derived locally from a camera chain of conventional type or it may be a received signal picked up from a line or a radio link. Whatever the source, the signal is supplied to the recording equipment through line 1, which will usually be a coaxial cable, and from this line it is fed in parallel to a plurality of modulators $3_1$, $3_2$ . . . $3_{n-1}$ and $3_n$. The broken lines in the figure indicate the presence of additional modulators; in equipment which has been built and tested the number of modulators used has been ten, but this is a matter of engineering design, dependent upon the particular service for which the apparatus is intended and hence the general designation of the number of modulators used. In the case illustrated double-balanced ring modulators are used, but various other types of switching equipment giving similar types of output signal may be employed, it being well known that various types of gating tubes, coincidence circuits, etc., can be used to accomplish the same result as far as output signal is concerned.

The carriers upon which the signal to be recorded is modulated are derived from a stabilized oscillator 5. The frequency thus developed should be very accurately controlled. Assuming that the signal to be recorded is actually a television signal, transmitted in accordance with present standards as promulgated by the Federal Communications Commission, the oscillator 5 is stabilized on a frequency which is either an odd harmonic of one-quarter the line frequency specified by such standards or departs from such frequency by not more than a few hundred cycles. At the time of the present writing the specified line frequency is 15,750 cycles and the field frequency 60 cycles per second. In the particular apparatus selected for description the oscillator 5 is stabilized by a temperature controlled piezo-electric crystal at a frequency which will be herein referred to, for convenience, as 169.5 kilocycles per second.

This nominal frequency is based on the 43rd harmonic of one-quarter of the line frequency, which is 169,312.5 cycles per second, but in practice its value has been varied from the base value to obtain various effects. As an odd harmonic of one-quarter the line frequency the 169,312.5 value falls into one of the gaps in the picture-frequency spectrum, but as these gaps are of material width the oscillator frequency can be varied by as much as several hundred cycles without noticeable effect as far as it itself and most of its harmonics are concerned. As will be shown hereinafter, however, it is the 20th harmonic of the oscillator frequency which is used, in the particular apparatus here described, for the final sampling of the recorded signals. If the exact 43rd harmonic is employed and the pulses used are sufficiently narrow, the resultant display on the screen is a dot structure wherein the dots are vertically alined and form a clearly visible pattern.

Shifting the oscillator frequency to the exact 169.5 kc. value alines the dots to an angle of about 30° and makes them much less apparent. Any shift of an odd multiple of three-fourths of a cycle per second from the 169,312.5 cycle value will give "dot-interlace" in successive frames, and make them practically invisible provided the screen used has sufficient persistence so that the flicker of the dots is not perceptible as "crawl." It is a practical necessity, however, if dot-interlace is to be maintained, to interlock the scanning and oscillator frequencies. If the oscillator frequency is shifted from the 169,312.5 cycle value by 393.75 cycles to 169,706.25 cycles the sampling frequency becomes the 431st harmonic of ½ the line frequency, and because of dot interlace may be made "invisible."

The 393.75 cycle frequency can be derived from either 169,312.5 or 169,706.25 cycles by frequency dividers of the counter type, and then either added to or subtracted from the frequency from which it is derived by heterodyning. In either case there can be derived, in the process, a frequency which can be interlocked with the line and field scanning frequencies, by methods known in connection with "sync generators" used in ordinary television equipment. The oscillator 5, may in fact, be one actually embodied in such equipment. It is not always either necessary or desirable that dot interlace be employed in connection with the present invention. The matter is discussed here to bring out the fact that although the frequency relations which will be explained hereinafter must be fairly accurate, as far as the invention itself is concerned they need not be exact to the last decimal. Therefore the 169.5 kc. value of the sampling frequency will be used in the discussion and the harmonics to be mentioned will be related to this value. Small departures from 169,312.5 cycles may make multiples visible per se which would not be visible if the correspondence were exact. Where this would be the case the value of the invention is actually increased. The criterion for the oscillator frequency is that it and its major harmonics shall not be frequencies normally present in the picture spectrum, and not that they be themselves "invisible."

The frequency developed by the oscillator 5 is used to stabilize a multivibrator 7, which develops a square wave form of the same frequency. This wave form is fed, through a pulse former, here shown as a differentiating network comprising a small series capacitor 9 and a shunt resistor 11, to a delay line generally indicated by the reference character 13. This line may comprise a solenoid winding 15 wound on a suitable core, in close apposition to but insulated from a ground strip 17. The total delay of signals transmitted down the line is nine-tenths of the half-period of the 169.5 kc. wave, or just a trifle over 3 microseconds. The delay line is terminated in a resistor 19 the characteristic impedance of the line, to prevent reflections, and is divided, in the present case, into nine equal sections, each giving a delay of approximately .295 microsecond.

The pulses developed by the differentiating circuit are themselves substantially 0.3 microsecond long. As developed they immediately appear at modulator $3_1$, and as or just after the trailing edge of the pulse passes this first modulator its leading edge arrives at modulator $3_2$, and so on down the line to modulator $3_n$, $n$ in this case being 10. As the trailing edge in this pulse passes the last modulator the leading edge of the "negative" pulse (if the pulse first considered be considered "positive") arrives at modulator $3_1$, and the process is continued indefinitely.

As the pulses reach each modulator there is modulated upon them the then instantaneous value of the television signal, which is applied to all modulators in parallel from lead 1, and the resultant modulated pulses are applied to conventional recording heads $21_1$, $21_2$, etc. to $21_{n-1}$ and $21_n$. The sine wave from oscillator 5 may also be applied directly to the recording medium through an additional recording head 23, to serve as a timing wave for the decoding of the signals, or the timing wave may be derived from one or more of the modulated waves as described in copending application, Serial No. 272,083 above identified.

A common recording medium, on which the signals are impressed in parallel tracks is symbolized by the line 25. Preferably this is a plastic tape coated with iron oxide, of the same character that is used in the recording of audio signals. The recording heads are also substantially identical in principle with those used for audio recording, although because of the desirability of recording a large number of tracks on the same medium and of making this medium as narrow as possible they are preferably modified in detail. One method of construction is described in the copending Mullin application above identified. The line 25 symbolizes the width and not the length of the recording medium; in practice it has been found possible to record the 10 video tracks plus the timing track, an audio track, and two frequency-modulated tracks upon a tape one-half inch wide, the frequency modulated tracks being employed for "drop-out compensation" as described in the copending application of the present inventor, Serial No. 393,844, above identified.

It will be understood that the recording of the television signals on multiple tracks is because of the fact that there is an upper limit to the frequencies that can be recorded on a moving medium with a magnetic gap or "aperture" of finite size, with a given speed of the medium. In the particular equipment which is here described in simplified form the speed of the medium is 100 inches per second. With magnetic gap lengths realizable in practice in the carrier frequency, modulated as described, can readily be recorded. The television signals reproducible by this equipment include frequencies up to between 3 and 4 mc., which are much too high for recording on a tape of this character moving at practical speeds. Furthermore, if it were attempted to record such a signal on a single track the bulk of the record would be very great and it would be difficult to handle.

In reproduction or play-back the equipment used is very similar to that employed in the recording, and with suitable switching equipment many of the elements may be the same as are actually used in the recording process. The reproducing equipment employs pickup heads adapted to engage the separate tracks. These heads are designated by the same reference characters used to designate the recording heads, distinguished by accents. The pickup head 23′ delivers a sine wave of the carrier frequency to a preamplifier 27, which raises its level to a desired value and supplies it to a phase discriminator 29. The phase discriminator is also supplied through a phase adjuster 33 from an oscillator 31, operating normally at the carrier frequency of 169.5 kc. The discriminator supplies the oscillator with an error signal through lead 35, thus holding the oscillator in step with the reference frequency signal as is well known. The use of the oscillator insures a demodulating signal of constant amplitude irrespective of possible imperfections or drop-outs in the reference waves.

The oscillator signal is fed to a multivibrator 7′ and thence to a differentiating circuit comprising a series condenser 9′ and shunt resistor 11′, substantially identical and, possibly, the same as is used in the recording equipment. This network generates pulses which are supplied to the delay line 13′.

Again this may be identical with that used in recording and it therefore need not be again described. The signals from the heads $21'_1$ to $21'_n$ are also fed to preamplifiers designated as $37_1$ to $37_n$, and thence to decoding modulators (or demodulators) $39_1$ to $39_n$. The second input circuits of the demodulators are supplied successively with pulses from the delay line 13′, and modulate these pulses with the instantaneous values of the recorded signals.

The output circuits of the demodulators connect in parallel to a common lead 41. If the phasing of the oscillator 31 is properly regulated through the phase adjuster 33, the pulses will arrive at each demodulator in synchronism with the crest of the appropriate recorded wave, and the pulses coming in succession at the right instant will substantially reconstitute the recorded signal. The copending applications above identified show various methods of extending the crests of the recorded waves so as to make them substantially flat-topped with the result that minor variations in phase of the recorded waves have no substantial effect upon the amplitude of the signal modulated upon the pulses.

It should be noted that in the preferred form of the invention the amplitude of the original television signal is impressed successively upon the positive and negative halves of the carrier wave. It is also to be noted that the pulses fed to the various demodulators are also alternately positive and negative as applied to any one demodulator. Since modulation is a multiplication process the product of a negative pulse with the negative half-cycle of the recorded wave results in a positive pulse in the output circuit 41, giving a signal which is always positive, to correspond with the always positive value of illumination on a television field of view. It is also to be emphasized that certain of the apparatus described in the copending applications, for use in the demodulating process, is considerably more elaborate than that mentioned here. The equipment which has been described is, however, fully operative and since the usefulness of the invention itself, which will next be described, is independent of the apparatus used in developing the signal, the description of the simplest form of the equipment is fully justified.

In accordance with the invention the reconstituted signal from line 41 is supplied to an amplifier 43, and thence to the filtering means 45. The output of the filtering means is a coaxial line 47, which may lead to a radio transmitter or to a transmission line, for distribution to either a local station or a network. This application is particularly concerned with the nature of the filtering means 47. A preferred form is illustrated schematically in Fig. 2. A simpler filtering means, which is useful in certain applications of the invention, is shown in Fig. 3.

In the form of the invention shown in Fig. 2 the filtering means is combined with the amplifier 43. In this embodiment of the invention the input circuit 41 first connects to a peaking network comprising a shunt resistor 49, followed by a series resistor 51 and capacitor 53 in parallel, with a second resistive shunt arm 55 following the series arm.

The input connects, through this conventional peaking circuit, to the control electrode of a pentode 57. Following first the course of the main output signal, tube 57 is coupled through the customary anode resistor 59 and blocking condenser 61 with the control grid of a second pentode 63. The grid of this latter tube is biased through a grid resistor 65 and cathode resistor 67. The plate circuit couples through resistor 69 and blocking condenser 71 with the grid of a cathode follower triode 73, also provided with a grid resistor 75. The load of tube 73 is taken off across a relatively high impedance cathode resistor 77, which may be of the order of 20,000 ohms resistance, giving this tube a gain of approximately unity. The main output circuit of tube 73 couples through a condenser 79 to the grid of a second cathode follower 81, which is included primarily for the purpose of matching the impedance of the coaxial output line 47, as shown in Fig. 1. In the equipment particularly described the cathode load resistor 83 of tube 81 has a value of 450 ohms, while the grid resistor 85, like those already mentioned, has a value of about one-half megohm.

The filtering circuit 45 of Fig. 1 is included in a feedback loop which branches from the output circuit of tube 81. A lead 87 connects through a blocking condenser 89 to the grid of a tetrode 91. This latter tube functions primarily as a cathode follower, although, as will be shown, the anode circuit also enters into its operation. The cathode resistor is, however, divided into two parts, one section 93, of about 100 ohms in the present instance, connecting directly to the cathode while a second section 95, of 150 ohms, connects to ground. A half-megohm grid resistor 97 returns to the junction between these two resistors, with the result that the negative feedback, characteristic of cathode follower operation, is something less than 100 percent and the gain of the tube can not therefore exceed unity.

The various filter elements are connected in parallel to a lead 99 connecting to the cathode. As shown, the filter networks tuned to the lower frequency harmonics each comprise a series-resonant circuit including an inductor $101_1$, $101_2$, etc., in series with condensers $103_1$, $103_2$, etc., each of these series-resonant circuits being connected, also in series, with a piezo-electric crystal $105_1$, $105_2$, etc., and the crystals have the same response in their series modes as the inductance-capacitance circuits with which they are in series. Connected between the junctions of the series-resonant circuits and their corresponding piezo-electric crystals are parallel resonant circuits, comprising inductors $107_1$, $107_2$, etc., and condensers $109_1$, $109_2$, etc., the opposite sides of each of these circuits being connected to ground and each circuit being tuned to respond at the same frequency as the series-resonant elements of the networks. The series arms of the networks connect to a lead 111 and thence to ground through a resistor 113. Each of the series-parallel-networks connecting leads 99 and 111 offers extremely low impedance to a very narrow band of frequencies centered on the series-resonant frequency of the particular crystal included in the network.

It may be noted here that in many cases the inductance-capacitance arms of the links between leads 99 and 111 may be omitted, the crystals themselves having narrow enough pass bands to serve satisfactorily and to give the desired narrow response, with substantially no cutoff beyond $\pm 2$ kc. from the resonant frequency of the crystals. The number of circuits included will vary with the ideas of the circuit designer and with the duty which is to be imposed upon the particular equipment with which the invention is used. At the minimum the frequency of response of the crystal circuits should include the carrier frequency of 169.5 kc. and its second harmonic of 339 kc. In the particular apparatus of Fig. 2 there are also filter circuits included for the higher harmonics up to the 20th. The crystals used, therefore, operate at frequencies spaced a nominal 169.5 kc. apart up to 3.39 mc. approximately. The Q of the higher frequency crystals in this range can readily be made high enough so that the additional elements of the filtering networks are unnecessary to provide a sufficiently sharp band of elimination. This is indicated by the showing of crystal $105_n$ connected directly across the line without the additional network elements. At frequencies as low as 169.5, and, in fact, up to the fourth or fifth harmonic, crystals of different cut and of lower Q may have to be used and it is to take care of this situation that the additional network elements are employed where necessary.

In addition to the sharply tuned harmonic frequency paths between leads 99 and 111, there also exists between them a certain amount of stray capacity including that of the mountings of the crystals. This would cause a gradual increase in attenuation of the higher frequency signals. Means are therefore provided for neutralizing this effect; tube 91 is provided with a small plate resistor 115, which may be of the order of 270 ohms. Connected between the plate of tube 91 and lead 111 is a small variable condenser 117. Since the drops across resistor 115 and the cathode resistors are in opposite senses, the signals fed to line 111 from the plate circuit may, by adjusting the small variable condenser 117, be made almost exactly to neutralize the signals of opposite sense supplied to the line through the stray capacities symbolized by the dotted condenser 119.

The potentials developed across resistor 113, representing a band almost wholly comprised of harmonics of the carrier frequency, are applied to the grid of a tube 121. The anode of this tube connects directly to the common anode source. Its cathode connects directly, through lead 123, with the cathode of tube 57, driving the latter through cathode resistor 125.

The signals from line 41, representing, for example, the output of a camera chain, may be considered as positive pulses of varying amplitudes. These pulses appear on the plate of tube 57 as negative pulses, and they are again inverted by tube 63 so that they appear on its output circuit again as positive pulses. Since tube 73 is a cathode follower these pulses are still positive as they appear on the lead 87 and as tube 91 is also a cathode follower tube they remain positive on the lead 99 and at the grid of tube 121 in so far as they appear there, i. e., the carrier harmonic content of these pulses is positive on the grid of tube 121. As this tube is also a cathode follower the cathode of tube 57 varies in the same manner, going positive when its grid is driven positive by an undesired harmonic and thereby tending to nullify the effect of the harmonic content as it appears on the grid of this tube. The gain of the amplifier comprising tubes 57, 63 and 73 is about 35 db, representing a voltage amplification of approximately 60 fold. The gain in the feedback loop including tubes 91 and 121 can be made somewhat greater than unity, although it will approach this value. Applying the well known feedback formula it will therefore be obvious that the harmonic content of the signals applied to the grid of tube 81 and thence to its output circuit will be down about 35 db as compared to the amplitude of these same frequencies in the absence of the filtering circuit.

Because the video frequencies are originally modulated upon the very frequencies which are eliminated and because the elimination of a carrier from a double-sideband-modulated signal normally results in a double frequency caused by the beat between two sidebands, it would appear at first consideration that the use of a filtering circuit such as is here described would result in a wholly unintelligible signal. However, as the signals appear on the grid of tube 81 they are not modulated upon a 169.5 carrier but upon a 3.39 mc. carrier, since this is the repetition rate of the pulses as they appear in that circuit. Actually even this frequency may be almost entirely absent, since the pulses may be made broad enough to overlap, in which case the signal does not drop to zero between pulses. If the apparatus is properly adjusted, even in the absence of the filters, the 169.5 kc. carrier would therefore not appear in the output nor would any of the subharmonics of the 3.39 mc. derived signal.

With regard to the sidebands resulting from the modulation of the signal, whether considered with respect of the original 169.5 kc. carrier or to the derived 3.39 mc. carrier, the situation is somewhat different. Since the component frequencies of the original television signal are, as has been shown, harmonics of the 15.75 kc. line frequency, they will be spaced from the respective carrier frequencies by substantially integral multiples of 15.75 kc. The arrangement which has been described makes the combination of amplifier 43 and filter feedback circuit 45 essentially a "slot" filter, with the elimination bands or slots approximately 4 kc. wide. Because of the choice of the original carrier frequency, multiples of 15.75 kc., added to or subtracted from this frequency, can never fall into one of the slots. The same is very nearly true of the sidebands when considered in connection with the derived carrier frequency of 3.39 mc. The eighth, and sixteenth harmonics of the 169.5 carrier are even multiples of the line frequency and therefore represent frequencies which could appear in the output signal. Picture frequencies of 678 kc., 1356 kc., 2034 kc., 2712 kc. and 3390 kc. would be eliminated by the filters and so, of course, would the 3.39 mc. derived carrier, if the pulses were not overlapped in the output so that the signals are "dot-connected."

It is not always desirable that the signals should be dot-connected; if dot-interlace is employed they should not be. In the latter event the 20th harmonic filter should be omitted. Normally the absence of these narrow bands of picture frequency in the spectrum will never be noticed. If, however, the presentation of a particular type of picture or signal should make it necessary that one or more of these four specific frequencies be present, a very large proportion of the value of the system would still be preserved if the corresponding filters were omitted.

With the specific exceptions mentioned it will therefore be seen that the elimination of the common carrier frequency and its harmonics has no effect upon the picture produced. There remains to be discussed the effect of the elimination of the harmonics upon undesired screen patterns and the manner in which the presence of the harmonics produces such patterns. It has already been pointed out that with the system here discussed both the encoding of the signal for recording and its decoding are modulation processes wherein the value of the successive pulses is multiplied by the instantaneous amplitude of a varying signal. If for any reason whatever the signal in any one channel is uniformly at a higher level or a lower level than the signals in the other channels, as would be caused by a difference in gain in one of the amplifiers in that channel with respect to those in the others, there would appear in the combined output signal a component of the second harmonic of the common 169.5 kc. carrier frequency, since the difference in amplification would result in a difference in amplitude of both halves of the carrier wave, so that, in the present case, every tenth pulse would differ from its normal amplitude. If the gain of two successive channels differed from the norm both the second harmonic and the twentieth harmonic would normally appear in the output, and differences in additional channels would cause various other harmonics to be evidenced.

In the event that the over-all amplification in each channel is uniform, but either the modulator or demodulator in one channel is unbalanced, the pulses representing the positive and negative halves of the waves will be of different amplitude and the result will be a component of the common carrier frequency in the combined signal. An unbalance in two successive channels will produce harmonics of both the fundamental carrier frequency and the tenth harmonic thereof. Unbalanced, non-successive carriers, will result in the production of various other harmonic frequencies. In addition to the harmonic frequencies thus produced there will be additional harmonics due to the shape of the pulses, although the amplitudes of these higher harmonics will fall off quite rapidly with increasing frequency. Where more than one harmonic is produced and the difference frequency between the two harmonics is four times that of the common carrier, as will be the case if the first and fifth, second and sixth, etc., or if the difference is eight, twelve, or sixteen times the common carrier frequency, the result will be a beat pattern which becomes visible on the screen. It will therefore be seen that the presence of any harmonic in the output signal may produce a visible beat provided there is also present a harmonic differing therefrom by a number of cycles equal to a harmonic of the line frequency, and that with a maladjustment of either the amplifiers or the modulators in any one or more of the channels such multiple harmonics may exist. The ones most likely to appear and to appear at relatively high amplitude are the common carrier frequency and its second harmonic; with any unbalance at all one or the other of these will certainly appear. Experimentation, however, has shown that even if the various channels are materially out of adjustment a satisfactory picture is produced provided the harmonic filters are provided as described.

The above is based on the assumption that the carrier is an exact odd harmonic of one-fourth the line frequency; in the present instance 169,312.5 cycles per second, and is therefore "invisible." If it is either of the two other frequencies specifically mentioned, although neither it nor its harmonics will normally be present in the signal they will be visible on the screen directly if because of channel unbalance they are so present.

It is, of course, advisable that the channels be balanced as accurately as possible. The use of negative feedbacks in the amplifiers, to the extent to which it is employed in that described and illustrated in Fig. 2, greatly decreases the degree of unbalances between the various channels, even though the tubes employed may have a very considerable difference in amplification constant. The unbiased cathode resistors used in connection with tubes 57 and 63, and the 100% feedback in the cathode follower tubes contribute to this end. Ring modulators, constructed with normal care, using good quality contact rectifiers, give a balance which is satisfactory for ordinary purposes, and vacuum tube modulators of the double balanced-type also give a reasonably good balance. As far as the picture itself is concerned no real difficulty need be experienced from unbalances of this character. The attenuation of the signal pulses through a delay line of about 3 microseconds is small, and, moreover, can be definitely computed and compensated for, so that again the picture signals themselves are not visibly distorted by the unbalances that exist where normal care has been exercised in the manufacture and adjustment of the equipment. Unbalances of this character therefore become obvious only in the overlying interference or beat pattern, and the latter is almost entirely eliminated by the present invention.

Under certain circumstances substantially the same effect can be secured by the simpler form of filter illustrated in Fig. 3. This latter figure shows a tube 131 which represents the final stage of amplifier 43. It is provided with a conventional anode resistor 133, and, to provide a stabilizing negative feedback, with an unbiased cathode resistor 135. The anode of this tube connects through a blocking condenser 137 with a peaking circuit comprising resistor 139, shunted by a condenser 141, and followed by a shunt resistor 143. The circuit then connects through a resistor 145, which may be about 1500 ohms in magnitude, with an output lead 47'. This latter may be the same as the leads 47 of Figs. 1 and 2, or it may connect into such a lead through a matching amplifier of the sort illustrated in Fig. 2 as tube 81.

Crystal filters 147$_1$, 147$_2$ . . . 147$_n$, are bridged directly from the line 47' to ground. Like the crystals 105 of Fig. 2, crystals 147 respond to the common carrier frequency and its various harmonics in accordance with their series-resonant mode of response. Instead of exercising their filtering functions by feeding back negatively to the input of the amplifier they accomplish the same general purpose by shorting the undesired frequencies to ground.

With the peaking circuit and output impedance of tube 131 designed to give a satisfactory impedance match, these filters of this latter arrangement are entirely adequate for the removal of the harmonic frequencies above 800 kilocycles. The criterion here is to obtain crystals with a sufficiently high Q to give the desired narrow elimination bands. There is therefore no significance to the 800 kilocycle figure, and with sufficiently accurate crystals with low enough damping the same type of connection would give equally good results at lower frequencies.

It may be noted that in Figs. 2 and 3 amplifier circuits have been shown which will not pass the direct current component of the television signal. The reason for this is the fact that A. C. amplifiers are stabler and more readily maintained in adjustment than the direct coupled amplifiers necessary to pass the D. C. component. It is therefore preferable to use A. C. type amplifiers throughout and to reestablish the D. C. component at the proper stage in the circuit by a D. C. restorer of the type familiar in usual home television receivers.

While the invention has been described in connection with television signals recorded on a specific number of tracks and using specific sampling and carrier frequencies, it should be evident that its utility is not limited either to television signals, to the carrier and sampling frequencies mentioned or to the number of tracks on which the recordings are made. For example, recorded radar signals may be displayed on a screen in which the scanning is spiral or substantially radial. In this case there may be line or field frequencies which represent the angular component of the scanning sweep and field or line frequencies which represent its radial component. If the angular component is the lower frequency the scanning lines will be substantially radial; if the higher frequency is representative of the angular component and the radial sweep is relatively slow the scanning pattern will be a tight spiral. In the former case the "invisible" frequencies will bear the same relationship to the line and field frequencies as in the case of the rectangular, parallel line raster of television transmission. If tight spiral scanning is used the "invisible" frequencies will be the odd harmonics of one-half the field and rotational frequencies. In either case the effect of eliminating the harmonics is the same, although which harmonics have to be eliminated will in general have to be different.

Furthermore, in testing television equipment, it is sometimes desirable to have available a signal which represents specific frequency components, in order to determine the action of the equipment with respect to these particular frequencies. It is sometimes possible to develop a simulated or synthesized television signal containing such components, to determine their effect in the absence of others. Such signals may be developed directly and recorded by the method here under consideration, and by filtering out the harmonics of the common carrier and sampling frequencies a presentation of such signals can be made in substantially pure form without the undesired components. The invention is therefore not limited to actual television signals, but is useful in connection with the recording of any broad band signals which are of like character to television signals in the distribution of their component frequencies, be they television, radar, instrumentation or test signals, or, in fact, any signals wherein the resultant spectrum is comprised of frequencies grouped around specific values, with gaps between the grouped signals. For this reason the description of the signals as television signals, and of the equipment as intended to handle television signals, it is not intended to be limiting but merely illustrative.

One factor in connection with the invention may be evident but should be specifically mentioned. Because of the nature of the filters used, and the extremely narrow elimination bands provided by such filtering means, it is necessary that the speed of the recording medium be either identical in the recording and reproducing processes or that the speed of the recording medium in reproduction bear an exact relationship to that employed in recording. Means for maintaining such exact speed correspondence is the subject matter of another application of the same inventor, and various others have proposed methods of obtaining such constancy. In certain recording applications, however, it is desired that the recording and playback be at different rates, either to speed up or slow down the apparent speed of action. This can be accomplished merely by changing the speed of the record. Where it is done the frequencies developed on playback may be very different from those used in recording. It would probably be only in very rare instances that the method of sampling and multiple-track recording here discussed would be used if the playback speed were higher than the recording speed, but the invention may be employed profitably if it is desired to play back at a lower speed than that at which recording was accomplished. Where such a technique is used the "common carrier frequency" referred to in the specification and claims would be that frequency as developed in the playback process, and the filtering means used for eliminating the harmonics would be related to the carrier as played back, whatever the relation of this frequency might be to the carrier frequency used in recording.

Having thus explained my invention, what is claimed is as follows:

1. A decoder for television or like broad-band signals recorded as a plurality of parallel tracks on a common recording medium, said tracks recording respectively a plurality of carrier waves of the same frequency relatively phase-displaced by successive substantially equal increments to provide collectively an uninterrupted succession of substantially equally spaced wave crests, the amplitudes of successive crests in said succession being substantially proportional to successive instantaneous values of the signals recorded, which comprises a plurality of transducer heads adapted to engage the respective tracks on such recording medium to develop from each of said tracks reproduced electrical waves substantially corresponding in relative phase and amplitude to the recorded waves, means for developing a plurality of trains of electrical pulses, the pulses in each train substantially coinciding in time and polarity with the crests of a corresponding one of said reproduced waves, means for intermodulating each of said trains of pulses with the reproduced wave whose crests coincide therewith to develop modulated trains of unidirectional pulses, a common output circuit connected to all of said inter-modulating means, and narrow-band-eliminating filter means interposed in said common output circuit and adapted substantially to remove from the signals in said circuit integral multiples of said common carrier frequency.

2. A decoder for television or like broad-band signals recorded as a plurality of parallel tracks on a common recording medium, said tracks recording respectively a plurality of carrier waves of the same frequency relatively phase-displaced by successive substantially equal increments to provide collectively an uninterrupted succession of substantially equally spaced wave crests, the amplitudes of successive crests in said succession being substantially proportional to successive instantaneous values of the signals recorded, which comprises a plurality of transducer heads adapted to engage the respective tracks on such recording medium to develop from each of said tracks reproduced electrical waves substantially corresponding in relative phase and amplitude to the recorded waves, means for developing a plurality of trains of electrical pulses, the pulses in each train substantially coinciding in time and polarity with the crests of a corresponding one of said reproduced waves, means for intermodulating each of said trains of pulses with the reproduced wave whose crests coincide therewith to develop modulated trains of unidirectional pulses, a common output circuit connected to all of said intermodulating means, and narrow-band-eliminating filter means interposed in said common output circuit and comprising an amplifier including a negative-feedback loop connecting the input and output thereof, said loop comprising a plurality of piezo electric crystals connected in parallel and series-resonant respectively to said common carrier frequency and harmonics thereof.

3. A decoder for television or like broad-band signals recorded as a plurality of parallel tracks on a common recording medium, said tracks recording respectively a plurality of carrier waves of the same frequency relatively phase-displaced by successive substantially equal increments to provide collectively an uninterrupted succession of substantially equally spaced wave crests, the amplitudes of successive crests in said succession being substantially proportional to successive instantaneous values of the signals recorded, which comprises a plurality of transducer heads adapted to engage the respective tracks on such recording medium to develop from each of said tracks reproduced electrical waves substantially corresponding in relative phase and amplitude to the recorded waves, means for developing a plurality of trains of electrical pulses, the pulses in each train substantially coinciding in time and polarity with the crests of a corresponding one of said reproduced waves, means for intermodulating each of said trains of pulses with the reproduced wave whose crests coincide therewith to develop modulated trains of unidirectional pulses, a common output circuit connected to all of said intermodulating means, and narrow-band-eliminating filter means interposed in said common output circuit and comprising a resistor connected in series therein and a plurality of piezo electric crystals connected in parallel across said circuit following said resistor and series-resonant respectively to integral multiples of said common carrier frequency.

4. A decoder for television or like broad-band signals recorded as a plurality of parallel tracks on a common recording medium, said tracks recording respectively a plurality of carrier waves of the same frequency relatively phase-displaced by successive substantially equal increments to provide collectively an uninterrupted succession of substantially equally spaced wave crests, the amplitudes of successive crests in said succession being substantially proportional to successive instantaneous values of the signals recorded, which comprises a plurality of transducer heads adapted to engage the respective tracks on such recording medium to develop from each of said tracks reproduced electrical waves substantially corresponding in relative phase and amplitude to the recorded waves, means for developing a plurality of trains of electrical pulses, the pulses in each train substantially coinciding in time and polarity with the crests of a corresponding one of said reproduced waves, means for intermodulating each of said trains of pulses with the reproduced wave whose crests coincide therewith to develop modulated trains of unidirectional pulses, a common output circuit connected to all of said intermodulating means, and narrow-band-eliminating filter means interposed in said common output circuit comprising an amplifier connected therein, a negative feedback loop connecting from the output to the input of said amplifier and comprising a plurality of networks connected in parallel, each of said networks including a pair of series-resonant arms connected in series and a parallel-resonant arm connected in shunt at the junction of said series arms, at least one of said series arms being a piezo electric crystal and all of the arms of each network being resonant at substantially the same frequency, the resonant frequencies of the arms of the various networks being different integral multiples of said common carrier frequency.

References Cited in the file of this patent

UNITED STATES PATENTS

| | | |
|---|---|---|
| 2,517,808 | Sziklai | Aug. 8, 1950 |
| 2,657,377 | Gray | Oct. 27, 1953 |